United States Patent
Sloan et al.

(10) Patent No.: US 7,126,602 B2
(45) Date of Patent: *Oct. 24, 2006

(54) INTERACTIVE HORIZON MAPPING

(75) Inventors: Peter-Pike Sloan, Bellevue, WA (US); Michael F. Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 107 days.

This patent is subject to a terminal disclaimer.

(21) Appl. No.: 10/983,359

(22) Filed: Nov. 8, 2004

(65) Prior Publication Data

US 2005/0156941 A1    Jul. 21, 2005

Related U.S. Application Data

(63) Continuation of application No. 09/892,924, filed on Jun. 26, 2001.

(51) Int. Cl.
   *G06T 15/50* (2006.01)
(52) U.S. Cl. .................. 345/426; 345/581; 345/582; 345/583; 345/584; 345/586; 345/589
(58) Field of Classification Search ................ 345/426, 345/581, 582, 583, 584, 586, 419, 589
See application file for complete search history.

(56) References Cited

U.S. PATENT DOCUMENTS

| | | | |
|---|---|---|---|
| 5,490,246 A | 2/1996 | Brotsky et al. | |
| 5,880,736 A | 3/1999 | Peercy et al. | |
| 5,949,424 A | 9/1999 | Cabral et al. | |
| 6,297,833 B1 | 10/2001 | Ho et al. | |
| 6,624,812 B1 | 9/2003 | Collodi | |
| 2001/0033284 A1 | 10/2001 | Chan | |
| 2001/0056575 A1 | 12/2001 | Wei et al. | |
| 2002/0033837 A1 | 3/2002 | Munro | |

OTHER PUBLICATIONS

Chapter 5: Shadow Generation Techniques, and Chapter 6: Mapping Techniques: Texture and Environment Mapping, pp.155-201.
Woo, et al., "A Survey of Shadow Algorithms", University of Toronto: Department of Computer Science, pp. 1-29.
Chapter 1: Rendering Polygonal Objects, and Chapter 2: The Theory and Practise of Light.Object Interaction, pp. 3-48.
Kautz, et al., "Bump Map Shadows for OpenGL Rendering", MPI Informalik, Feb. 2000, pp.1-20.
Kautz, "Shadow Bump Maps", available at http://www.mpl-sb.mpo.de/-jnkautz/projects/shadowbumpmaps/index.html. 4 pages.

(Continued)

*Primary Examiner*—Kimbinh T. Nguyen
(74) *Attorney, Agent, or Firm*—Lee&Hayes, PLLC

(57) ABSTRACT

Shadows, which play an important role in perceiving the shape and texture of an object, are simulated interactively in a real time, self-shadowing of a bump mapped surface for a computer rendered object. A computer graphics textured object function defines a horizon map over an orientation in a tangent space of the object using different textures or basis functions. The implementation can be performed using commodity graphics hardware by precomputing the horizon map for limited visibility for each point on the bump mapped surface given light in each of a plurality of radial directions. The horizon map is used to produce self-shadowing of the bump mapped surface of the object.

10 Claims, 14 Drawing Sheets
(6 of 14 Drawing Sheet(s) Filed in Color)

OTHER PUBLICATIONS

"3D Graphics Demystified", NVIDIA Corporation, pp. 1-22, plus pp. 1-4.

Sloan, et al, "Interactive Horizon Mapping", Microsoft research, pp. 1-7.

Heldrich, et al., "Illuminating Micro Geometry Based on Precomputed Visibility", Computer Graphics Proceedings. Annual Conference Series, 2000, Jul. 2000, pp. 455-326.

McCool, et al., "Texture Shaders", Proceedings 1999 Eurographics / Siggraph Workshop on Graphics Hardware, Aug. 1999, pp. 117-126.

Segal, et al., "Fast Shadows and Lighting Effects Using Texture Mapping", Computer Graphics, vol.26, No. 2, Jul. 1992, pp. 249-252.

Kautz, et al., "Towards Interactive Bump Mapping wuth Anisotropic Shift-Variant BRDFs". Max-Planck-Institute for Computer Sciencce, 8 pages.

Zhang, "Forward Shadow Mapping", University of North Carolina at Chapel Hill: Department of Computer Science, pp. 131-138.

Williams, "Casting Curved Shadows on Curved Surfaces", Computer Graphics, vol. 12, No. 3, Aug. 1978, New York Institute of Technology: Computer Lab, pp. 270-274.

Blinn, "Simulation of Wrinkled Surfaces", Computer Graphics, vol. 12, No. 3. Aug. 1978, Caltech/JPL, pp. 286-292.

Max, "HorizonMapping: Shadows for Bump-Mapped Surfaces", The Visual Computer, 4, 1988, pp. 109-117.

Sloan, et al., "Shadowed Bump Maps", Figures A-O, pp. 1-27.

Heldrich, et al., "Applications of Pixel Textures in Vosualization and Realistic Image Synthesis", 1999 Symposium on Interactive 3DGraphics, pp. 127-134.

Heldrich, et al., "Realistic, Hardware-accelerated Shading and Lighting", Max-Planck-Institute for Computer Science, 8 pages.

INTERACTIVE HORIZON MAPPING

RELATED APPLICATIONS

This non-provisional patent application is a continuation of, and incorporates by reference, application Ser. No. 09/892,924, filed Jun. 26, 2001, by the same inventors and commonly assigned with this application.

TECHNICAL FIELD

The present invention relates to computer graphics renderings, and more particularly to systems, methods, and program products for real time shadowing of bump mapped surfaces using horizon mapping in computer graphics renderings.

BACKGROUND

Computer graphics involves the rendering of images for display on a visual terminal of a computer. Rendering involves the translation of the three-dimensional (3D) geometry of graphical objects into picture elements (pixels) that are stored in a frame buffer. The contents of the frame buffer can then be displayed on the visual terminal or display device.

In a computer gaming, 3D animation is used to display a sequence of images interactively to the user of the computer game, which gives the illusion of motion in three-dimensional space. This interactivity allows a user to change a scene or the point of view in the scene. These on-demand changes initiated by the user require a rendering system that can create new images in real-time.

Computer games are one example of a 3D computer graphics system. Others include computer-aided design (CAD) and virtual reality ("VR"). A 3D graphics accelerator is typically used in these types of systems. The graphics hardware is used to receive off-loaded processing functions from a host processor to speed up system performance.

An application program executing on a host processor generates three-dimensional geometry data including information corresponding to points on the surface of a three-dimensional graphical object. These points are usable as vertices of polygons which, when connected, may be rendered to form a representation of the graphical object. The application program causes the host processor to transfer this 3-D geometry data to a graphics accelerator, along with corresponding control and connectivity information. The graphics accelerator receives this stream of compressed 3-D geometry data and, for reasons of speed and diversity, renders a series a collection of flat encoded polygons, for example triangles, in a frame buffer for subsequent display on an attached display device. A polygonal system such as this has the advantage of being able to translate and project such objects quickly and efficiently. The process of connecting three-dimensional vertices into component polygons, the sum of which represents a graphical object, is referred to as "tiling".

Each graphical object to be rendered has a coordinate system that is local to the graphical object within the 3D computer graphics system. This coordinate system needs to be transformed from the coordinate system of the graphical object to the pixel display coordinates in the frame buffer. Once the geometry of the object has been transformed into screen coordinates, it is rasterized or broken into a set of pixel color values that are stored into the frame buffer.

Each corner or vertex of each polygon has associated therewith certain values for pixel parameters based on the graphical object itself and the environmental properties of the graphical object. Interpolation is used for each pixel in the polygon area to generate the pixel parameters. One such pixel parameter is texture. Texture on the polygon is suggested by means of a texture map to accomplish finer detail in the polygon.

In conventional commodity graphics hardware, the surface of an object is typically digitally represented by a texture in terms of four (4) color channels, namely red, green, blue, and alpha. At each vertex of each polygon, two-dimensional (2D) coordinates are specified for the orientation in the tangent plane of the light. The 2D qualities include color and brightness and are encoded by the first three channels. A texture is also encoded with three-dimensional properties, such as how transparent and reflective the object is by use of the fourth channel—the alpha channel. Once at texture is parameterized by a point on a surface, another texture can be parameterized by where the light is relative to the local surface point. Then, once a texture has been defined, it can be wrapped around any 3-dimensional object in a texture mapping process.

A texture map is a picture stored in a computer memory as a bit map that is applied to the polygons that make up the graphical object to make the graphical object look more realistic. The texture map is comprised of individual two dimensional space rectangular 'texels' coordinates that depict a certain texture. When the texels are mapped onto a polygon, it will appear to be textured.

Texture mapping processes can be used to render an appearance of a smooth surface. A more realistic and topographical rendering, however, can be accomplished using a texture map that is known as a bump map. Bump mapping uses a bump map that is associated with a surface. The bump map, which is normally pre-calculated into a look up table stored in memory, is a collection of different surface normal vectors on different surface locations of the surface to create an impression of a rough surface. Stated otherwise, bump mapping simulates the effect of light reflecting from small perturbations across a surface. Bump mapping, often considered as the application of a shading function to an object, is done on a pixel-by-pixel basis.

Bump mapping techniques, which convey surface texture by perturbing the normal vectors of a surface, are available on conventional commodity graphics hardware. The advantage of bump mapping is that it provides a simple way to modulate the shading on a surface. Bump maps represent a special kind of texture map. Instead of a color, each texel of a bump map contains a height field gradient. Bump maps are applied to a surface of an object using standard texture-mapping tools. Very complex surfaces (wrinkles, folds, bumps) can be simulated without increasing the complexity of the surface itself. A space in which the bump map is defined is called a map space.

In bump mapping, texel coordinates, designated as "u" and "v", are used in a single component texture map, $f(u, v)$. The texture map is interpreted as a height field that perturbs at each point on the surface along its normal vector $$N=(P_u \times P_v)/|(P_u \times P_v)|, \qquad (1)$$

where $P_u$ and $P_v$ are partials of the parameterization of texture space axes u and v. Rather than actually changing the surface geometry, however, only the normal vector is modified.

Shadows play an important providing perceptual cues for perceiving surface shape and surface texture of an object. Bump mapping, however, does not define any explicit geometry such that there are no actual bumps to cast shadows. Stated otherwise, a bump defined by a conventional bump mapping function can cast neither a bumpy shadow nor a shadow on another object. Thus, interactive shadowing techniques that rely on an explicit representation of the geometry cannot be used to simulate shadows cast by the virtual bumps implied in bump mapping.

It would be an advance in the art to provide a technique to render with commodity graphics hardware, in real time at interactive rates, a graphical image of an object having a bump mapped surface, where the bumps on the bump mapped surface cast shadows, thus more accurately accounting for the geometry of the underlying bump mapped surface. It would also be an advance in the art to represent limited self-shadowing for pure geometry while maintaining interactivity with a user of a computer.

SUMMARY

Interactive, real time self-shadowing, also known as horizon mapping, of a bump mapped surface is implemented for computer rendered objects. To do so, a system, method and program product are provided to represent a computer graphics textured object function that is defined over an orientation in a tangent space of the object using different textures or basis functions. The implementations described herein can be performed using commodity graphics hardware in real time, interactively.

A technique is presented for casting of shadows by a precomputation of limited visibility for each point on a bump mapped surface. In particular, the lowest angle to the horizon is encoded in a discrete number of radial directions to each point to represent at what height each point becomes visible from each radial direction. This parameterization produces the self-shadowing of the surface geometry.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Generally, the same numbers are used throughout the drawings to reference like elements and features.

DETAILED DESCRIPTION

Bump and Horizon Mapping

In dot product bump mapping, also known normal mapping or bump mapping, vectors that are normal ("the normals") to a surface are modified instead of modifying the height of the surface. The modifications to the normals render diffuse and specular reflections from small surface bumps on the surface. The technique directly stores the normals of the surface in texture maps. Bump mapping is particularly effective in rendering visual cues because the prime component in the calculation of the intensity of a picture element (pixel) is the direction of the surface normal at that pixel. For each point on a surface, there corresponds a height value by which this point would be raised on the surface.

Horizon mapping approximates the shadows cast by the bumps on the same surface. As such, a computation can be made to self-shadow bump maps by describing the horizon for a small number of directions at each point in the height field. During rendering a shadow test is performed to determine, for each point on the height field, whether the light direction is above or below the interpolated horizon.

The bump function produces a two dimensional table of height values for each point on the height field. A computation is made and stored, for each of the height values, of the lowest angle between a vector towards the visible horizon and the surface plane. A series of directions around the horizon, such as at the eight (8) main compass points—e.g. N., S., E., W., N.E., S.E., S.W., and N.W.), are computed for each point on the height field of the surface plane.

During the rendering stage, the lowest horizon angle at the intersection point is interpolated from the light direction and the horizon map for each point on the height field. If the lowest horizon angle from the surface normal is greater than the angle from the light direction to a point on the height field point, then that point is in shadow. Shadowing of bump mapped surfaces is implemented in an algorithm that maximizes the power of a frame buffer in a commodity graphics hardware environment so as to realize real time, interactivity in computer graphics applications. This algorithm, implemented in a computer graphics application, will now be discussed in reference to the Figures.

Figure 1:
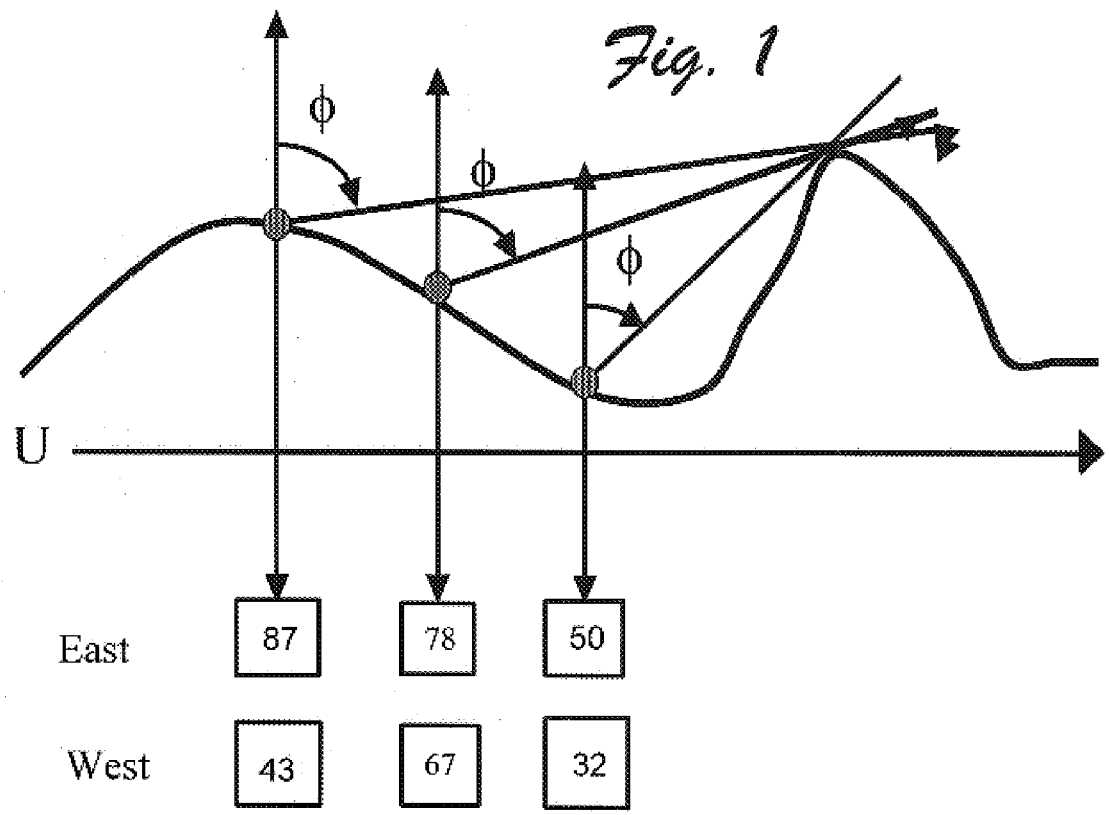
FIG. 1 depicts a bumped curved surface having points thereon and an angle therefrom to the lowest eastern horizon.

FIG. 1 depicts a bumped curved surface along a texture space axis 'U' of a plane, the surface having three (3) points thereon, each point having a normal to the 'U' axis that makes an angle Φ with respect to the lowest eastern horizon vector for that point, where the numerical value of Φ is shown. FIG. 1 also shows numerical values for the horizon angle in the westerly direction for each of the three points, although the topography to the west is no shown in FIG. 1.

Figure 2:
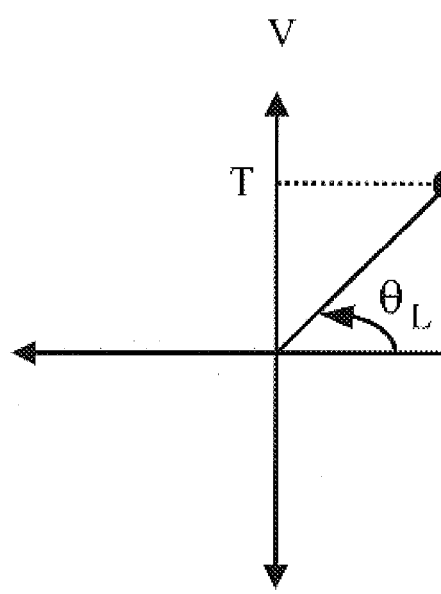
FIG. 2 depicts one of the points seen in FIG. 1 at the origin, a projection of a vector to the light source upon the tangent plane contain the point in FIG. 1, and an angle that represents the orientation of the projected vector in the tangent plane.

FIG. 2 depicts texture space axes 'U' and 'V' intersecting at one of the three (3) points seen in FIG. 1, where a vector extends from that point towards a light source, the vector making an angle $\theta_L$ with respect to the 'U' axis, where the light source is projected down to a location on the flat plane represented by texture space axes 'U' and 'V', and where the location on the flat plane has the two-dimensional coordinates 'T' and 'S'. The angle $\theta_L$ represents the direction of light from the light source with respect to the tangent plane of the point.

Figure 3:
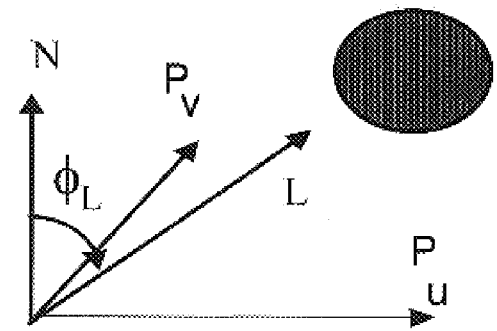
FIG. 3 depicts a normal N taken from a plane that is perpendicular to the surface seen in FIG. 1 at the point seen in FIGS. 1 and 2.
Figure 4:
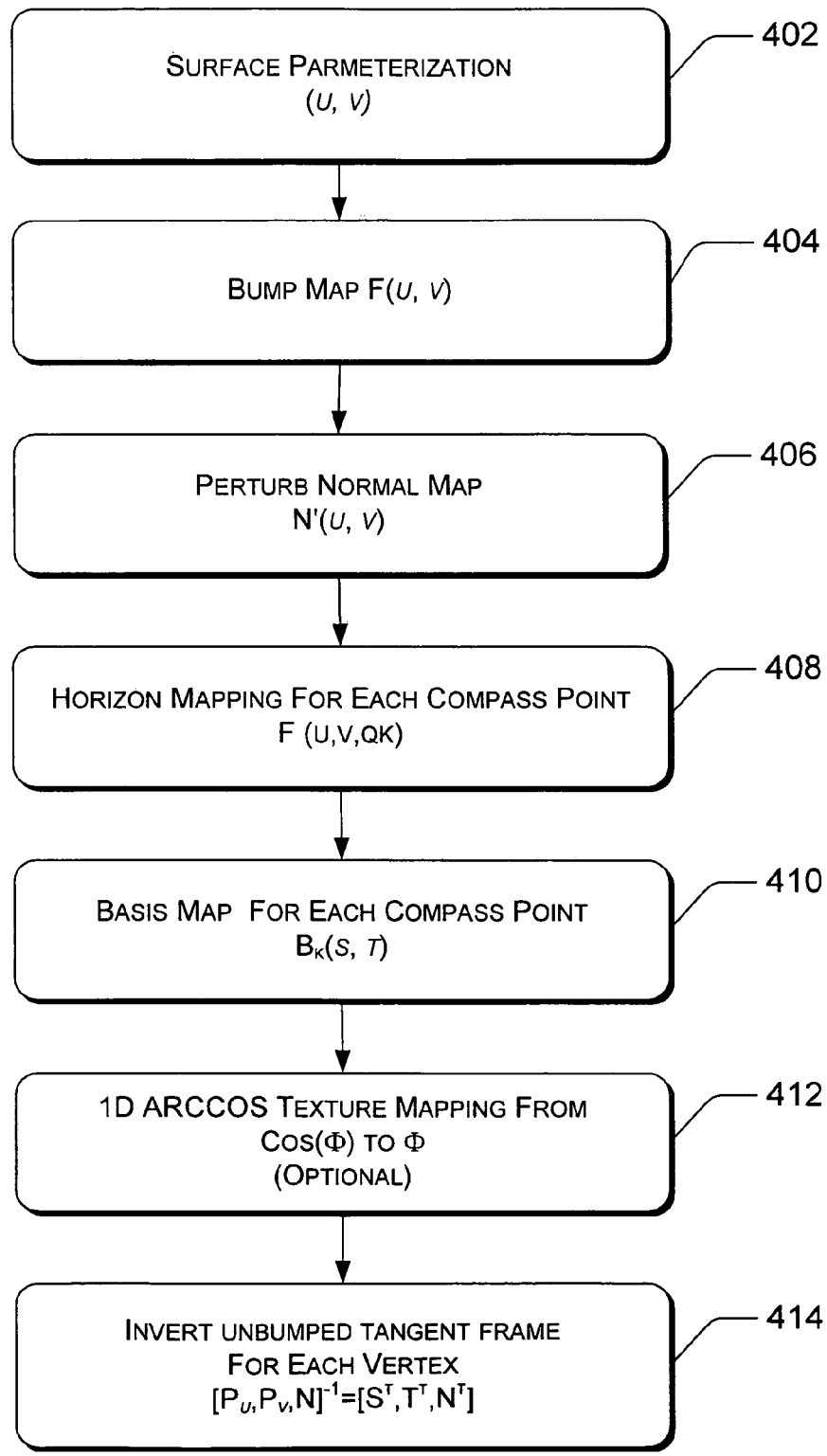
FIG. 4 is a flow diagram showing an illustrative methodological implementation of the invention herein, and particularly showing preprocess precomputation operations performed noninteractively in texture space.

FIG. 3 depicts the partials of the parameterization, namely vectors $P_u$, $P_v$, for a light vector L that makes an angle $\Phi_L$ with respect to a normal N taken from a plane that is tangential to the bumped surface seen in FIG. 1 at the point seen in FIGS. 1 and 2. Normal N and the vectors $P_u$, $P_v$ intersect at the point. Light from the depicted light source first strikes the point at the lowest angle $\Phi_L$ over the eastern horizon along a vector L.

As seen by the examples in FIGS. 1–3, $P_u$ and $P_v$ are the partials of the parameterization of the texture space axes 'u' and 'v'. A surface P(u,v) is parameterized on the unit square, and a surface normal N can be computed as the cross product of the partials of the surface $P_u$ and $P_v$. Given a bump map F(u,v) as a non-negative scalar function parameterized over the same domain, the surface normal N can be modified, after dropping terms of first order, as follows:

$$P'_u = P_u + F_u N/|N|,\ P'_v = P_v + F_v N/|N|,\ N' = P'_u \times P'_v = N + D, \quad (2)$$

$$\text{where } D = (F_u N \times P_v - F_v N \times P_u)/|N| \quad (3)$$

is the perturbation of the normal.

Horizon mapping is performed into the local coordinate system of the surface. This mapping is performed through the dual of the basis $P_u$, $P_v$, N, where N is the unbump-mapped surface normal which can be determined by an affine transform. The mapping is computed by building a matrix with the basis as columns and inverting it, where the rows of this inverse are a scaled version of $N \times P_v$ and $P_u \times N$, along with N itself. A vector in this local frame has an associated orientation in the tangent plane $\theta$ and an angle with the normal $\Phi$.

There is then a determination made, at each pixel, whether a light vector, when transformed into the local coordinate frame, is visible above the horizon. To discover this, a horizon map, $\Phi_{u,v,\theta}$, is built. The horizon map is tabulated at discrete u, v parameter values, and in a set of directions $\theta$, to represent the azimuth angle $\Phi$ when a light would become visible at each direction $\theta$. By way of example, u and v are sampled fairly densely (e.g. 512×512), and $\theta$ is sampled more coarsely (the eight (8) main compass points—e.g. N., S., E., W., N.E., S.E., S.W., and N.W.).

An advantage is gained in horizon mapping of bumped, curved surfaces. Particularly, the precomputed horizon map is created in terms of the local geometry at each discrete (u, v) coordinate. This is possible and practical in the present implementation because the underlying geometry of the bumped, curved surface is known at the time when the horizon map is computed.

Given the variable M to represent a number of sampled directions (the eight (8) main compass points—e.g. N., S., E., W., N.E., S.E., S.W., and N.W.) for $\theta$ and the discrete domain coordinates $u_i$, $v_j$, then the horizon angle $\Phi$ ($u_i$, $v_j$, $\theta$) for any direction at coordinates $u_i$, $v_j$ is found by interpolating between the discrete directions as follows:

$$\phi(u_i, v_j, \theta) = \sum_{k=1}^{M} B_k(\theta) \phi(i, j, k), \quad (4)$$

where $B_k(\theta)$ is a basis function for the $k^{th}$ direction. The basis function $B_k(\theta)$ in the linear case is evaluated to one for the corresponding direction and linearly falls off to zero for the neighboring directions. For example, if the kth direction is east then the value of the linear basis function $B_k(\theta)$ is one when $\theta$ equals east, and the value falls off to zero at the two closest compass points (northeast (N.E.) and southeast (S.E.)). In other words, the horizon angle $\Phi$ is interpolated between discrete directions, noting that since this is a radial function it wraps around to interpolate between $\Phi$ (i, j, 1) and $\Phi$ (i, j, M). Similarly, the function $\Phi(u, v, \theta)$ is bilinearly interpolated across the parameters u and v. In general the basis functions can be any functions that are all positive and sum to 1 for any orientation $\theta$. The coefficients for linear basis functions can be determined just by point sampling a discrete number of directions, but in general the coefficients for any shape of basis functions can be computed by solving a simple linear least squares problem that relates the coefficients of the basis functions to a potentially super sampled set of horizon angles at various orientations.

To test the visibility of a light source from a point on a surface, the direction (x, y, z) from the point to the light source is transformed into the local tangent frame by a simple affine transform to provide the local coordinates (u, v, $\theta$). While the angle $\theta$ could be determined by projecting the transformed vector onto the tangent plane, it is desirable that the first two transformed coordinates are used as a lookup into a table of $\theta$ directions. The look up table will, by example, be encoded as a texture in the computer hardware. The table may be considered to be a set of texture maps.

The texture mapping feature is conventional in commodity graphics hardware. By using the texture mapping feature that is provided with conventional commodity graphics hardware to store horizon maps, the need for sophisticated hardware and expensive host processor time is avoided. As such, horizon mapping of curved, bumped surfaces is enabled using the texture mapping capabilities of conventional commodity graphics hardware.

General Self-Shadowing with Horizon Maps

The tangent plane parameterization and discretization used to compute shadows for bump maps can also be used to store global visibility information about a surface in general. The horizon angles are determined by shooting rays into a graphical object, starting from the horizon and moving towards the surface normal until there is no intersection. The largest angle that can be represented, by this determination of the horizon angles in the horizon map, is ninety (90) degrees out of the tangent plane. This determination of the shadows from bump maps is sufficient for most surfaces that lack undercut features.

Implementation on Commodity Graphics Hardware

As was generally discussed above, horizon mapping can be performed for curved, bumped surfaces using the texture mapping capabilities of conventional commodity graphics hardware. A discussion is now presented, in reference to FIGS. 4–7, for both the precomputation and the runtime shadowing algorithm and implementation thereof for commodity graphics hardware.

Precomputation

The surface to be bumped and horizon mapped is tiled into a collection of polygons to which a texture is to be mapped in a parameterization thereof. The bump map will be represented in one such texture parameterization of the surface. The parameterization, seen at Block 402 in FIG. 4, dictates how the bump map will wrap or fit upon the surface. The algorithm requires several inputs, including the coordinate values u, v associated with every vertex of each polygon, the geometry of the surface as a parameterization in the u, v coordinates, and a non-negative scalar valued bump map, F (u, v), depicted at Block 404, that is parameterized over the surface.

Before a graphical object is displayed upon a peripheral device, such as a computer screen, so as to be visible to a computer user, precomputation operations first are performed upon the inputs discussed above. For each vertex of each polygon representing a surface on each graphical object, a vector valued perturbed normal map, N'(u, v) is precomputed at Block 406 from the non-negative scalar valued bump map, F (u, v). The normal map carries the bump map into the normal at every pixel. Stated otherwise, the surface height is perturbed at every pixel in this precomputation phase.

To compute the normal map in texture space, there are given 'M' directions in the tangent plane for an angle $\theta_{k=1 \ldots M}$. M will, by example, be represented by the eight (8) main compass points (e.g. N., S., E., W., N.E., S.E., S.W, and N.W.). As such, one horizon map, $\Phi(u, v, \theta_k)$, is computed for each $\theta_k$ at Block 408, for a total of M horizon maps. When M=8, the eight horizon maps be collected into only two (2) horizon maps by encoding four (4) of the eight directions into the four (4) color channels of texture storage. It is intended that the first direction be stored in the red channel, the second direction be stored in the green channel, the third direction be stored in the blue channel, and the forth direction is stored in the alpha ($\alpha$) channel. As such, the first horizon map might encode the directions N., N.E., E. and S.E., while a second map encodes the directions S., S.W., W. and N.W. Stated otherwise, a plurality of M radial directions could be approximately equally distributed from about zero radians to about 2$\Pi$ radians about each coordinate point (u,v). By way of example, one radial direction could be taken from about zero radians to about $\Pi/2$ radians, another radial direction could be from about $\Pi/2$ radians to about $\Pi$ radians, another radial direction could be from about $\Pi$ radians to about 3/2$\Pi$ radians, and still another radial direction could be from about 3/2$\Pi$ radians to about 2$\Pi$ radians.

M basis maps are also precomputed. As such, there is one (1) basis function for each of the eight (8) discrete directions. Each of the M basis maps are derived at Block 410 and are represented by $B_k(s, t)$, where (s, t) represents the influence of the direction of the light source, $\theta_k$, as set forth in Eq. 4, above. The encoding of the M basis maps will, by example, be similar to the encoding of the M horizon maps, again using the texture capabilities of conventional commodity graphics hardware. Accordingly, two (2) basis maps are encoded to each contain four (4) of the eight (8) directions.

The encoding scheme for the normal and horizon maps realize a computational efficiency in that the dot products can be computed four (4) at a time by multiplying the weight of the basis function (the orientation value) times the horizon values. This implementation represents functions over orientations on a surface such that, for every point, for any orientation, there will be some function.

An optional precomputation, seen at Block 412, can derive a one dimensional arccosine mapping for each mapped point from the cosine of the horizon angle (cos($\Phi$)) to the horizon angle $\Phi$. This precomputation compares the cosines of the horizon angles instead of comparing the horizon angles themselves. Such an approximation is more readily realized because the dot products yield cosines.

Another precomputation operation that is performed for each vertex is the scaling of the duals or a dual for the tangent frame basis, where computations are made for transformations into texture space. This per vertex computation, which is seen at Block 414, is represented as $$[P_u, P_v, N]^{-1} = [S^T, T^T, N^T], \qquad (5)$$

and inverts the non-bump mapped local tangent frame. For a planar surface, the local tangent plane is the same for all vertices, but varies at each vertex over a curved surface. The inversion of the non-bump mapped local tangent frame allows a ready transform of the light direction onto the local tangent plane of the surface at each frame time.

These precomputed data could be stored in volatile or nonvolatile memory since the date will not be needed until run time. By way of example and not by way of limitation, computer gaming applications may store horizon maps in precomputed texture space on computer readable media such as a CD-ROM. When the computer game is played, the CD-ROM is read by a computer having conventional commodity graphics hardware, or its functional equivalent, to access and use the precomputed horizon maps.

At Each Frame Time, At Run Time

Use is made of the precomputed data during the interactive execution of the associated graphics program. For each scene to be rendered, given a current lighting condition, a computation is made at each vertex of each polygon for each graphical object for (s,t,$\phi_L$), where s, t are the orientation coordinates of a point in the tangent plane at the vertex, and $\phi_L$ is the angle between the light and the normal at that point. The view to be rendered at this point is not taken into account because the shadows to be depicted are not view-dependent.

Set Up Camera to Draw into Texture Space

Figure 5:
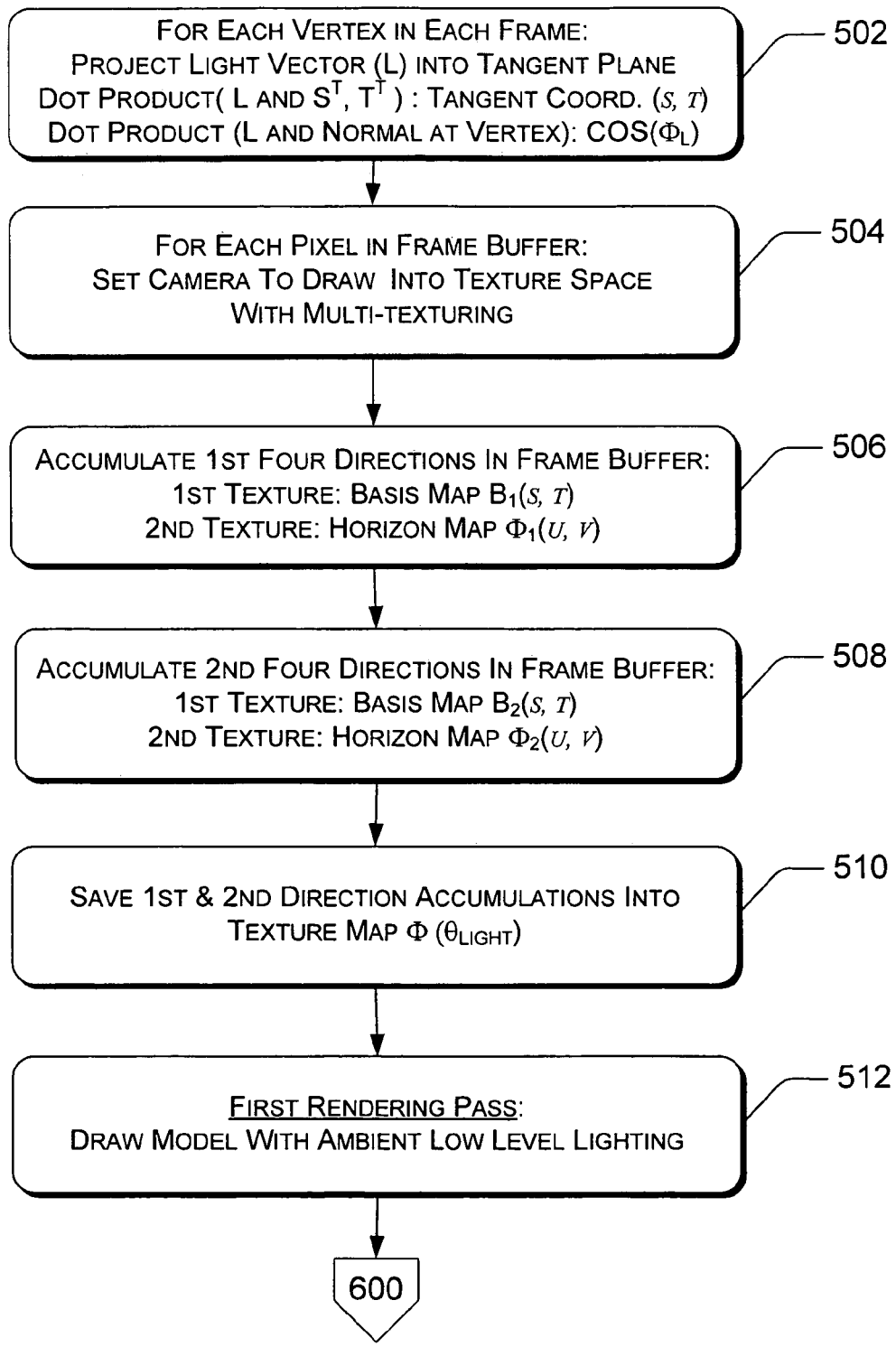
FIG. 5 is a flow diagram showing run time operations to follow the precomputation operations of FIG. 4.

A computation is made at Block 502 in FIG. 5 for each point as to the horizon angle that the light source would have be greater than for that point not to be in the shadow generated by the topography from that light source. Given the precomputation above, at each frame time, light is first projected in a light direction onto the local tangent plane at each vertex of each polygon. The light vector when dotted with the first two components of the inverted frame S and T yields the projection of the light vector into the coordinate space in the tangent plane resulting in the pair, (s, t). The light vector dotted with the normal at each vertex gives cos($\Phi_L$).

The remainder of the computation is carried out per pixel and is done in hardware using multi-texturing and blending into the frame buffer. The multi-texturing that is used in this implementation is different than conventional multi-texturing which multiplies the normal map times the diffuse color. This implementation, however, sums up the weighted basis functions instead.

The multi-texturing begins at Block 504 by setting transformations so as to render into UV space, by using the u, v coordinates as vertex coordinates. To do so, the textures are multiplied by the components thereof, the results of the multiplications are summed, and the results are stored in the alpha ($\alpha$) channel. The contribution for each of the first four (4) of eight (8) directions are accumulated into the frame buffer at Block 506 in FIG. 5. The first texture in the multi-texturing process is the basis map $B_1$ (s, t) for the directions east, northeast, north, and northwest, where the s, t coordinates are for each vertex and are derived from the light direction. The second texture is the horizon map, $\Phi_1$ (u, v), for the same directions as the first texture, but indexed by the u, v from the surface.

The contribution for each of the last four (4) of eight (8) directions are accumulated into the frame buffer at Block

508. The first texture is the basis map $B_2$ (s, t) for the directions east, northeast, north, and northwest, and the second texture is the horizon map, $\Phi_2$ (u, v), for the same directions as the first texture. The resulting alpha ($\alpha$) channel now represents the horizon angle, $\Phi$, in the direction of the light. The results are saved into a texture map represented by $\Phi$ ($\theta_{LIGHT}$).

The foregoing basis function and horizon map computations can be multiplied together and then added into the frame buffer for each of the eight (8) directions. The frame buffer then stores, for every pixel on each surface and for each of the eight directions, the angle to the horizon for each corresponding point on the surface.

Set Up Camera to Draw into Scene

Following the storage of the horizon angles in the frame buffer at Block 510 in FIG. 5, three (3) rendering passes are performed, each computing the transformations to draw into the current view of camera of the scene. The first pass, seen in FIG. 5 at reference numeral 512, draws the model with only ambient lighting in the frame buffer. Also, the depth buffer is initialized to compute the distance of every pixel from the front of the scene such that only the front most pixel is visible.

Figure 6:
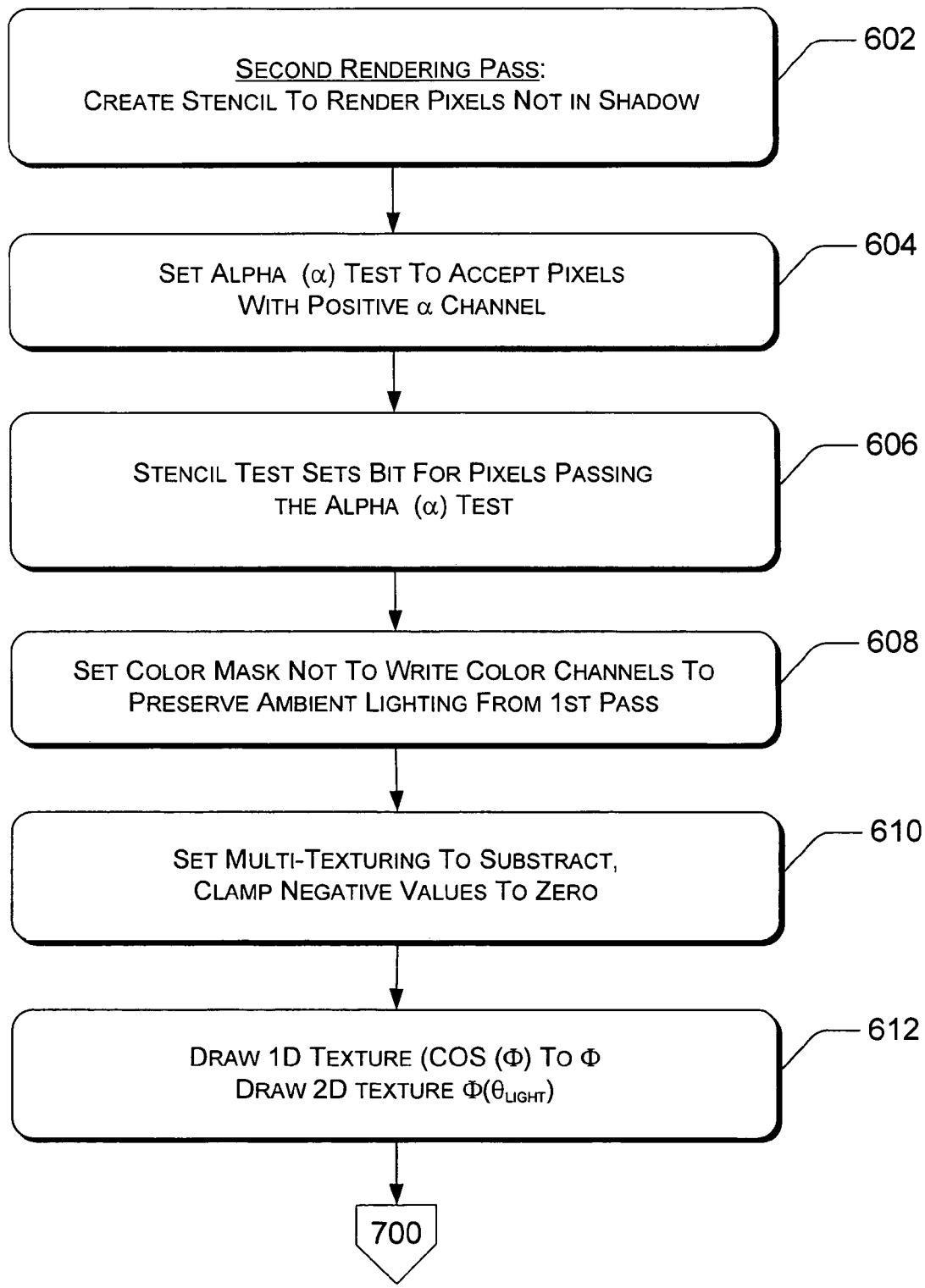
FIG. 6 is a flow diagram showing run time operations to follow the run time operations of FIG. 5.

A second of the three passes, seen in FIG. 6 at reference numeral 602, creates a stencil that will only allow non-shadowed pixels to be rendered. This pass sets an alpha test, at Block 604, which will accept pixels for display only if the corresponding alpha channel value is non-zero. All pixels having a non-zero value in the corresponding alpha channel are permitted to pass through at Block 606. As such, the graphical object to be rendered is drawn to avoid drawing any point that is in shadow. Procedurally, no point is drawn where the stencil has a bit corresponding to the point that is set so as to be representative of the point being in shadow. Then, iterations are performed for each of the eight (8) directions.

After the directional iterations are computed in the second pass, a color mask is then set at Block 608 so that color channels are not written. The color mask thus preserves the ambient term that was set in the first pass.

Following the color mask operation, a multi-texturing function is performed. The multi-texturing function is set to subtract values at Block 610, where any negative value is set to zero, in that negative numbers are not meaningful to shadow renderings.

The scene is drawn at Block 612 in FIG. 6 using the precomputed two (2) sets of texture coordinates. These texture coordinates represent, for each point given the direction of the current light source, the angles from the tangent plane of the point to the light source and the angles from the surface normal to the lowest horizontal point on the topography. Subtracting the two texture values will yield a light-value in the alpha ($\alpha$) channel. Positive light-values will result in the surface being drawn in the light and zero values will result in the surface being drawn in shadow, in that negative values are set to zero in the alpha channel.

The two textures used in the second pass and are represented as a 1D texture and a 2D texture. The 1D texture is $\cos(\Phi) > \Phi$, where $\cos(\Phi)$ of the light was previously computed and store for at each vertex. This result contains the angle off the normal to the light at each pixel. The 2D texture is $\Phi$ ($\theta_{LIGHT}$) that was previously computed and stored for each vertex. The 2D texture encodes the angle off the normal of the horizon in the direction of the light at each pixel.

In essence, the foregoing 1D and 2D texture operations make use of the red, blue, green, and alpha channels that are conventionally used for lighting in the texture feature of commodity graphics hardware. The present implementation, however, uses these color channels to combine and weight the horizon textures with the basis textures in a reconstruction of the texturing function. As such, the implementation uses the general notion of a dot product different than is conventional. Accordingly, less computations are performed for each of the eight (8) directions, in that only two (2) passes are required, namely four (4) channels and directions on the first pass and four (4) channels and directions on the second pass, resulting in a computation that is four times as fast.

Figure 7:
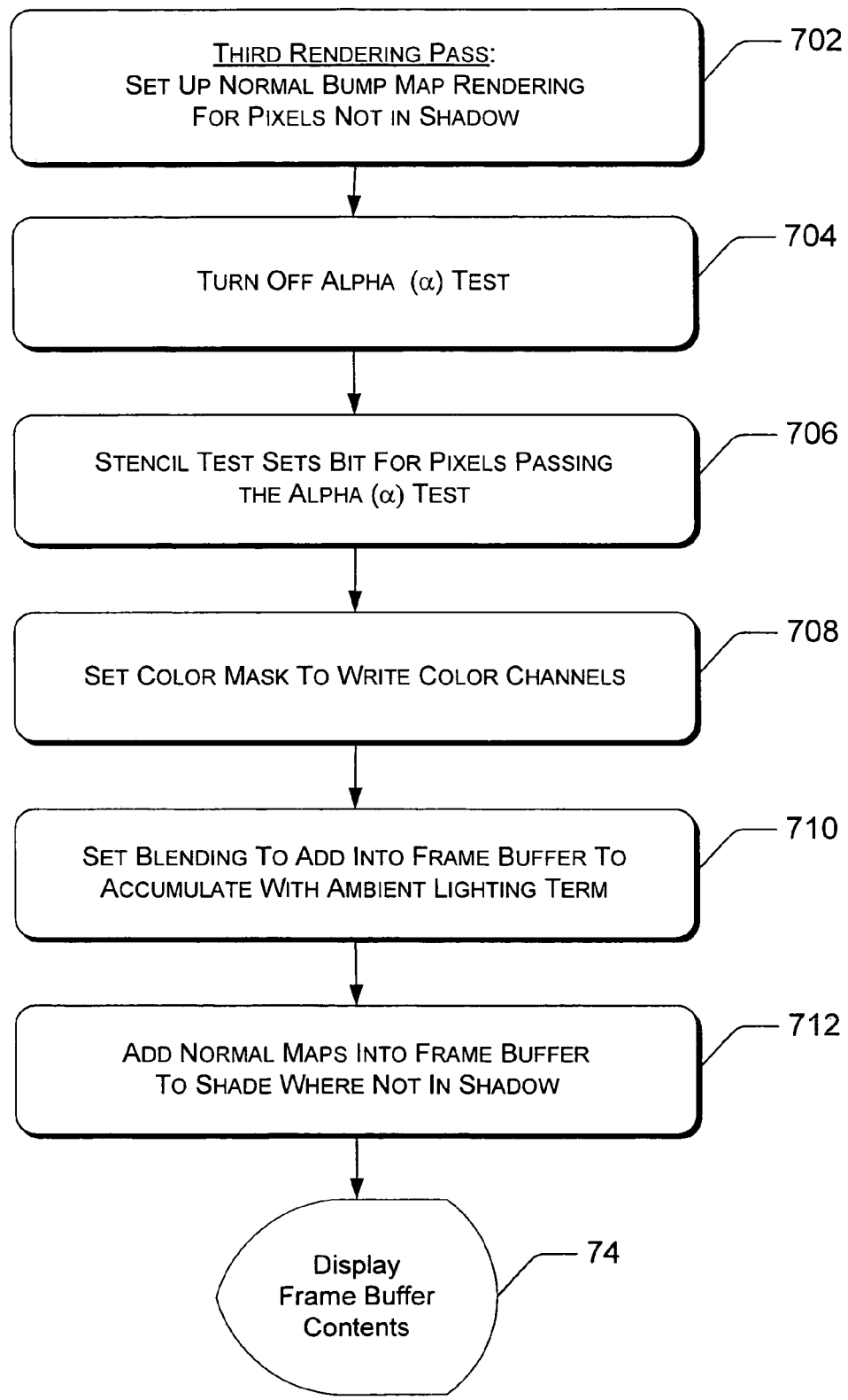
FIG. 7 is a flow diagram showing run time operations to follow the run time operations of FIG. 6.

The last of the three passes, the initiation of which is seen in FIG. 7 at reference numeral 702, performs a normal bump mapped rendering of the model wherever the pixels in the frame buffer are not in shadow. Since a test of the alpha channel would not be meaningful where points are in shadow, the alpha test is turned off at Block 704. A stencil is set at Block 706 to prevent any pixel not having its stencil bit set from being drawn so that only those pixels intended to be seen are drawn. Then, at Block 708, a color mask is set in place to allow for the writing of the color channels into the frame buffer. A blending function is enabled at Block 710. The bending function adds other lighting to the ambient low level lighting that was previously accounted for in the frame buffer. The other lighting to be added to the image in this blending function includes diffuse and specular lighting.

Following the blending of other lighting, previously computed normal maps are added into the frame buffer at Block 712 to the graphical object to be rendered from the contents of the frame buffer in a standard bump mapping operation. Block 712 has the effect of shading the non-shadowed regions of the graphical object given the lighting present on the surfaces being rendered. Optionally, methods other than conventional normal mapping over the surfaces could also be used, such as bit mapped textures, etc.

Following the last of the three (3) passes, an image is rendered on a display device at Block 714 so as to display an ambient only term in shadowed regions and a normal bump mapping in non-shadowed regions. In order to create lighter shadows, the shadowed regions can be rendered with a lighter diffuse term rather than ambient only. This can be done in a fourth pass, not shown, by first setting the stencil function to only draw pixels that do not have the stencil bit set and by then drawing the geometry again using normal bump mapping, but with the scaled-down diffuse term. This fourth pass can also be combined with the first ambient pass. Iterating on creating the light dependent horizon map and the resulting alpha test can also be done for multiple light sources.

The results of the foregoing implementation, in various stages of renderings, are depicted in FIGS. 9A–9B through FIGS. 17A–17C.

Figure 9A:
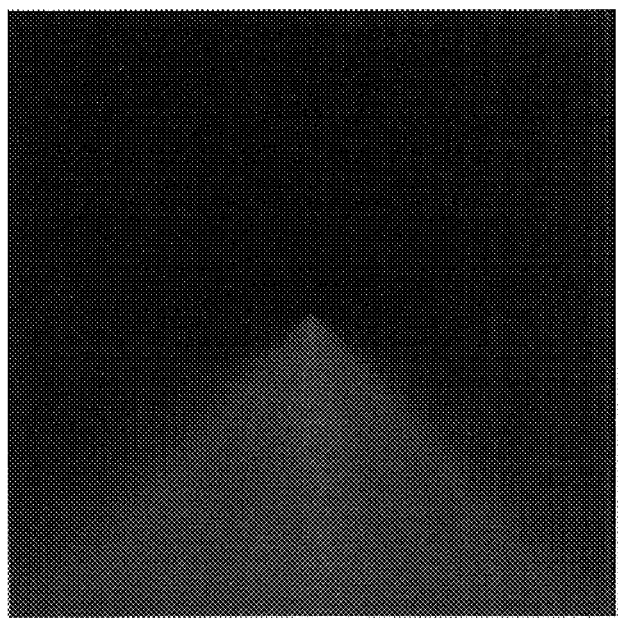
FIGS. 9A–9B through FIG. 17A–17C are renderings, in various stages thereof, that were produced using the interactive horizon mapping implementations disclosed herein.
Figure 9B:
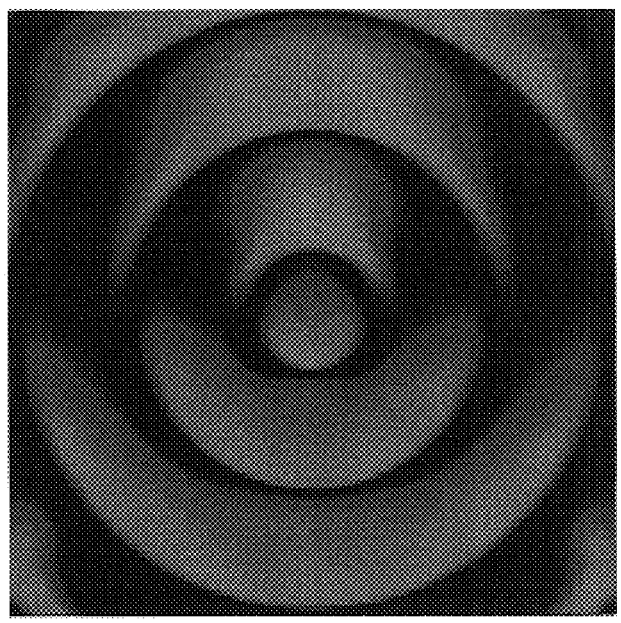

FIG. 9A depicts a basis function for the bump mapped surface rendering that is self-shadowed by horizon mapping and seen in FIG. 9B.

Figure 10A:
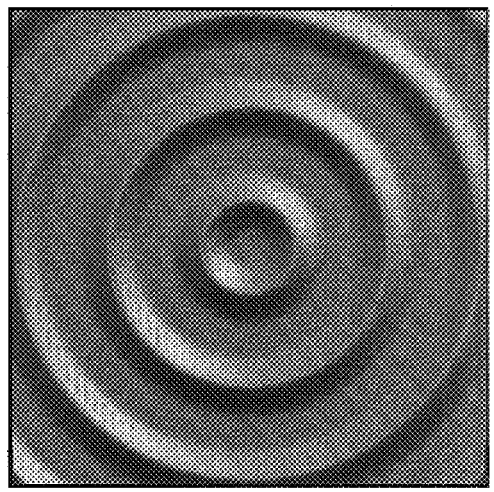
Figure 10B:
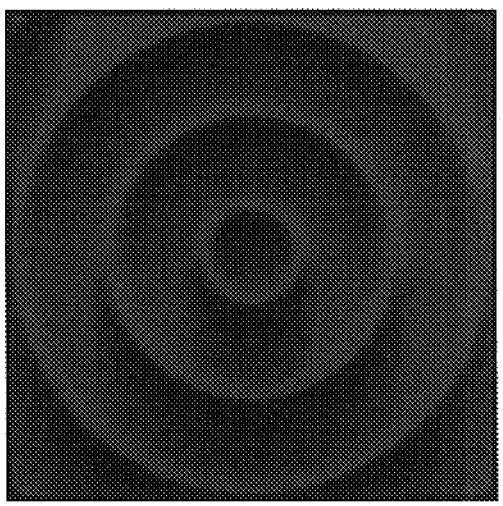
Figure 10C:
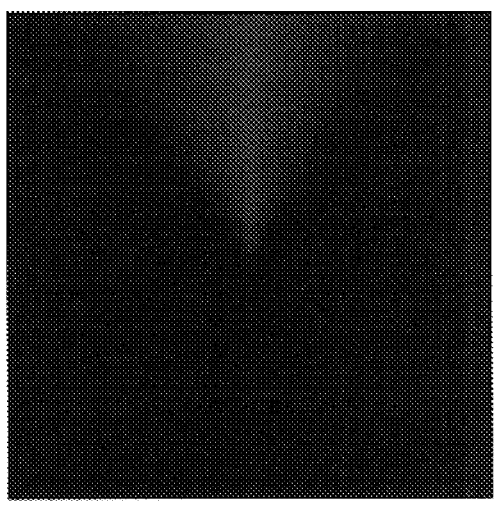

FIG. 10A shows the rendering of a normal map of a surface which is seen in FIG. 10B with a horizon mapping that includes a light source coming from the north, and where FIG. 10C illustrates the northerly light source basis texture for FIG. 10B.

Figure 11A:
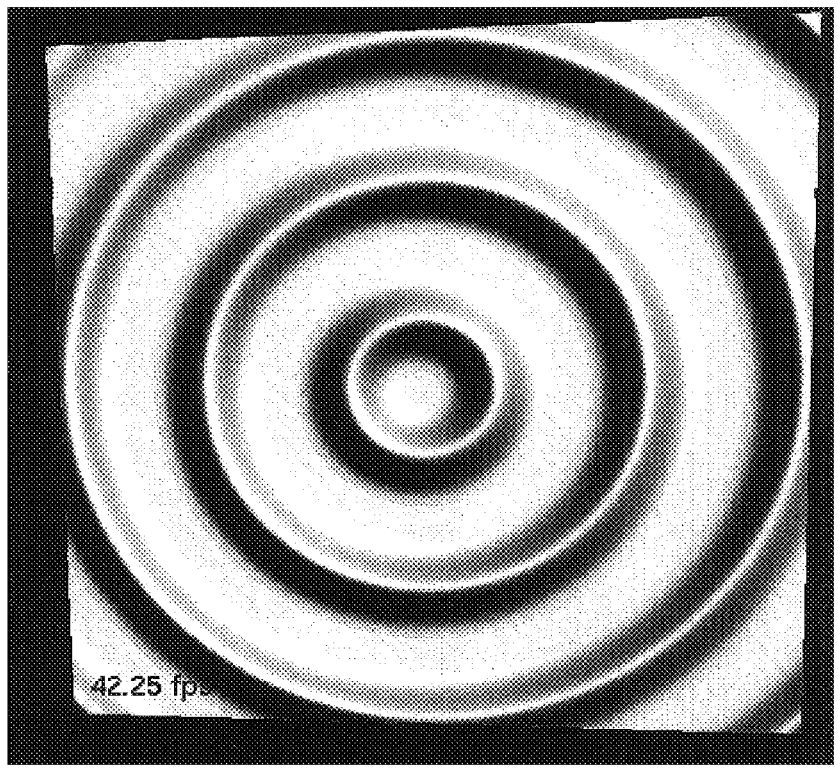
Figure 11B:
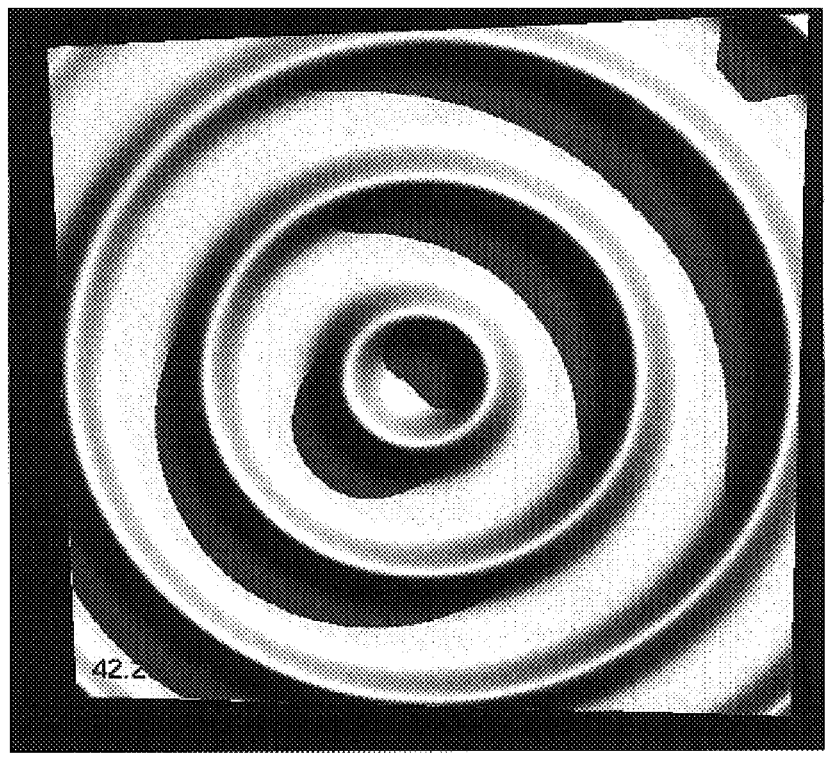

FIG. 11A is a rendering of a surface that is bump mapped, where the surface is rendered in FIG. 11B with shadowing via horizon mapping by a northeasterly light source.

Figure 12A:
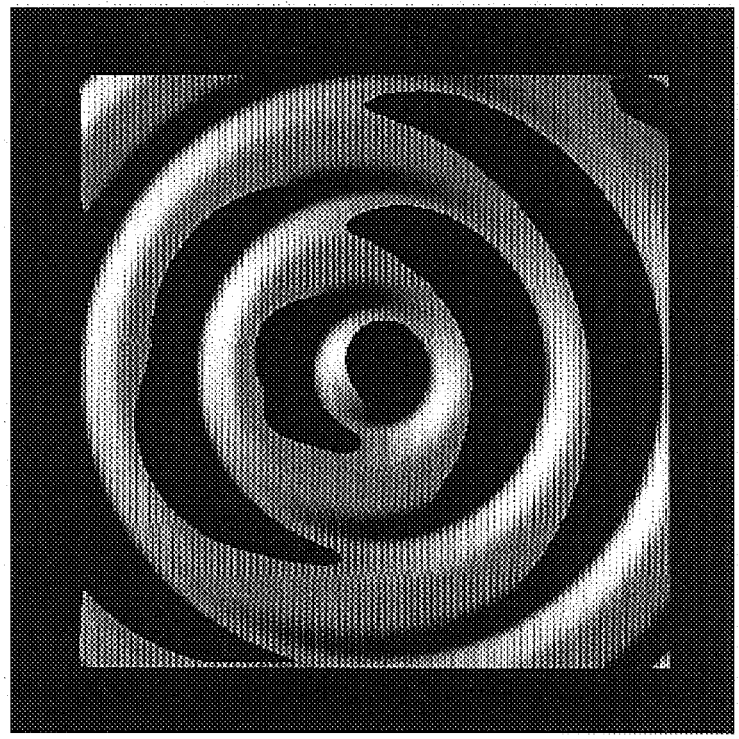
Figure 12B:
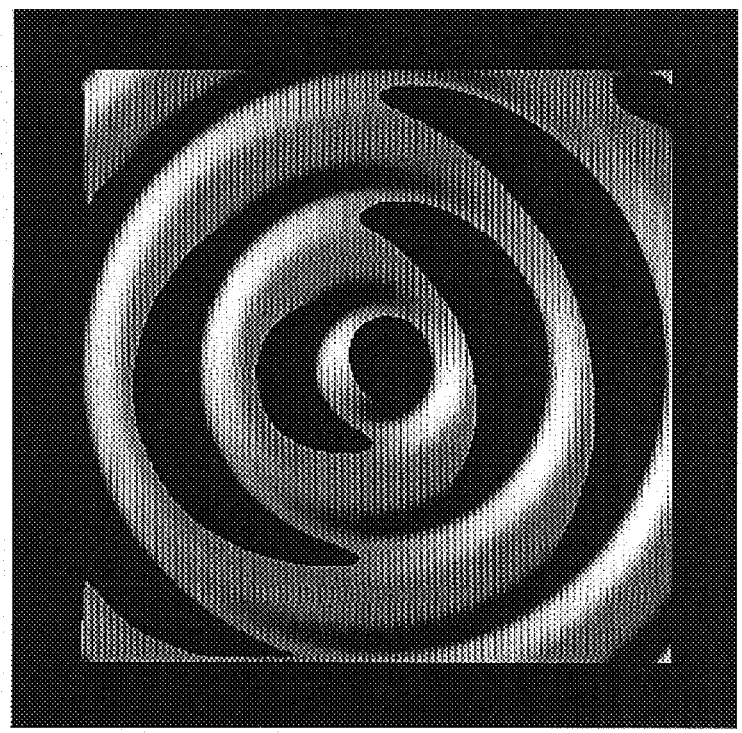

FIGS. 12A and 12B, both of which are seen as being lit by a northeasterly light source, are renderings that feature horizon mapping techniques that are, respectively, point sampling and curve fitting.

Figure 13A:
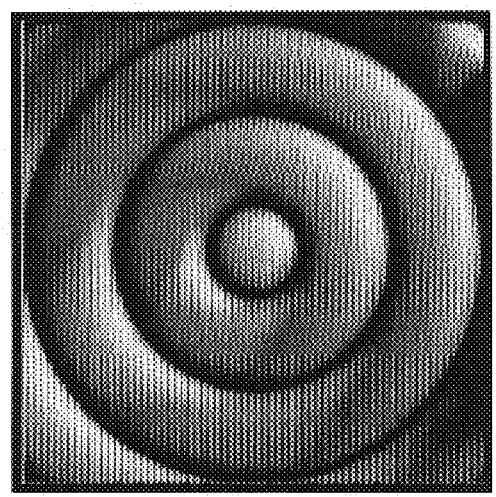
Figure 13B:
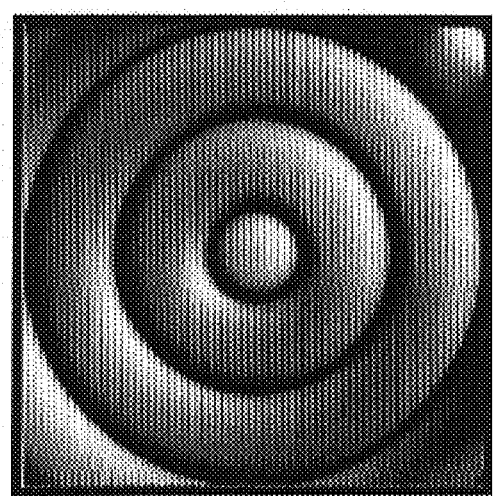

FIGS. 13A and 13B are renderings of the same bump mapped surface lit by a southwesterly light source, where FIG. 13A illustrates shadows rendered by point sampled horizon mapping, where FIG. 13B features the shadow that are smoother than that of FIG. 13A through the use of a super sampling of curve fitting in a horizon mapping technique.

Figure 14A:
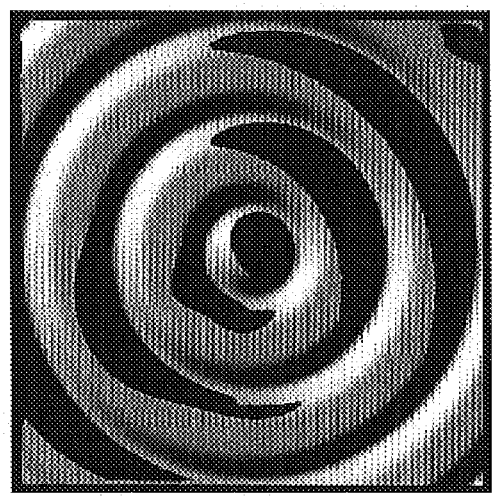
Figure 14B:
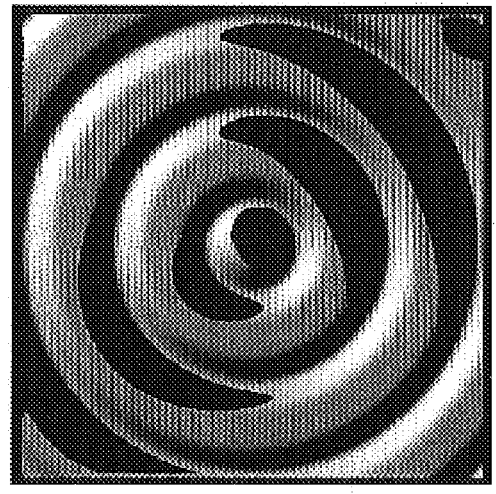

FIGS. 14A and 14B are renderings of the same bump mapped surface lit by a southwesterly light source, where FIG. 14A has rougher shadows of point sampled horizon mapping and FIG. 14B features smoother shadows that are accomplished by sampling more points than the rendering seen in FIG. 14A.

Figure 15A:
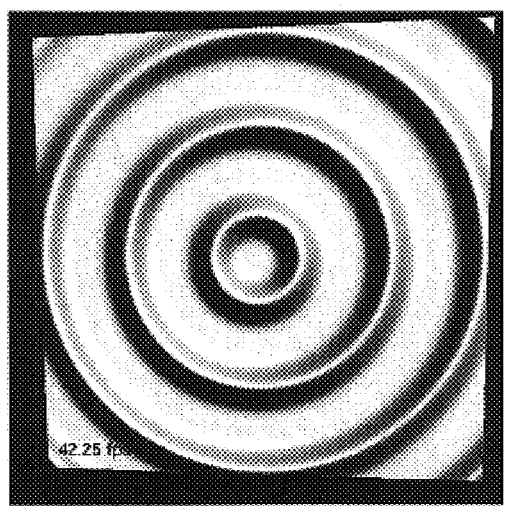
Figure 15B:
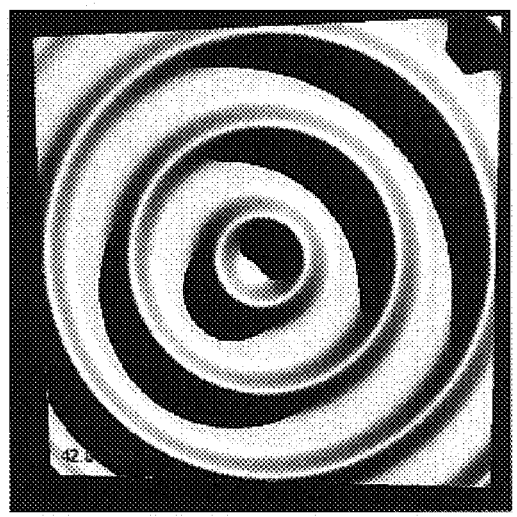
Figure 15C:
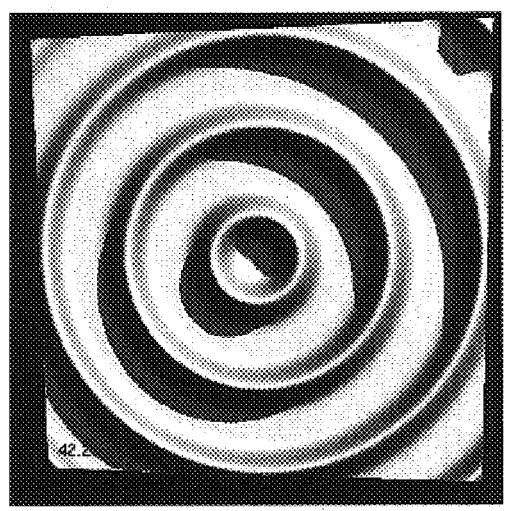

FIGS. 15A–C are renderings of bump mapped surface of a simple plane, and respectively showing a normal map without shadowing, dense shadows accomplished by horizon mapping, and light shadows accomplished by horizon mapping.

Figure 16A:
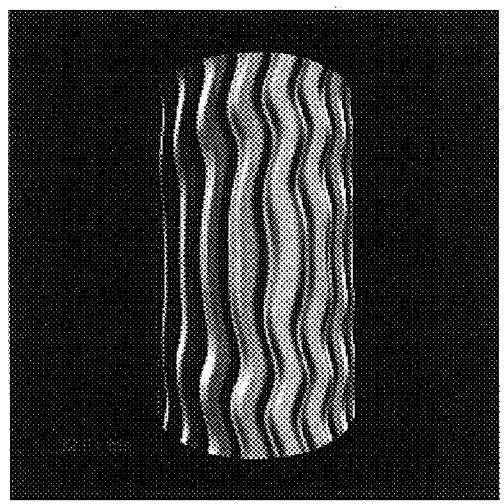
Figure 16B:
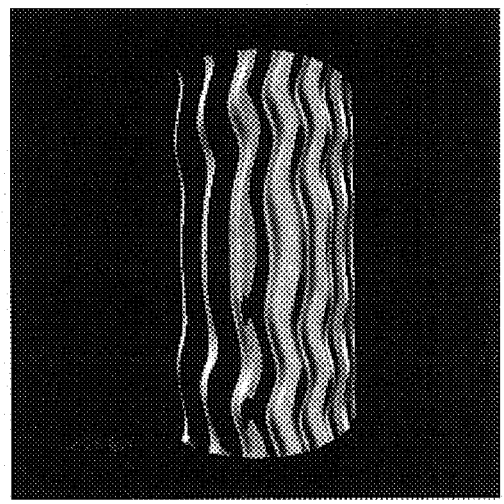
Figure 16C:
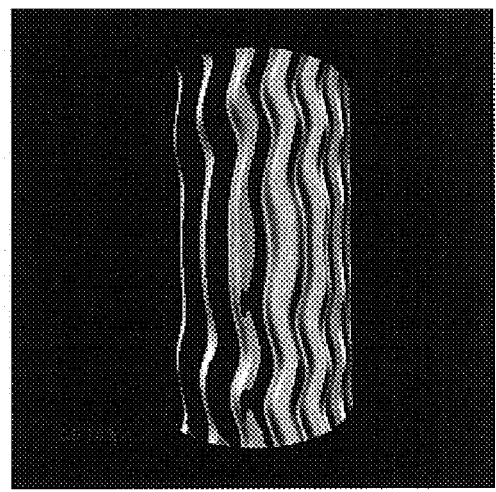

FIGS. 16A–C are renderings of the same bump mapped cylindrical surface having 160 vertices and 158 triangles, and respectively showing the cylindrical surface without horizon mapping, with dense shadows accomplished by horizon mapping, and with light shadows accomplished by horizon mapping.

Figure 17A:
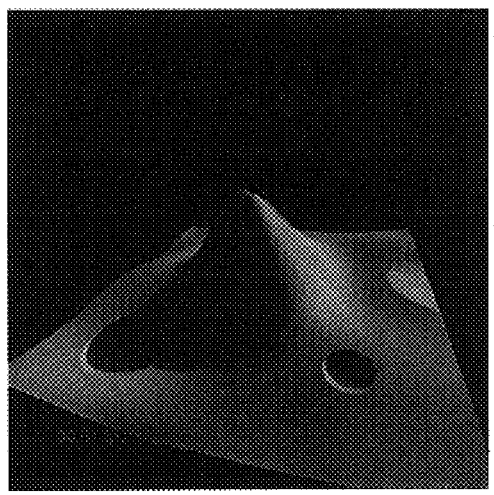
Figure 17B:
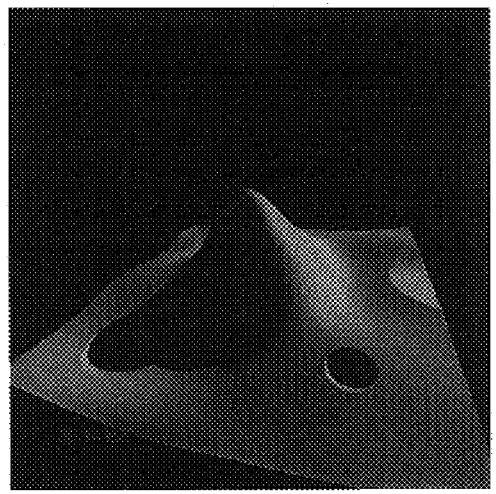
Figure 17C:
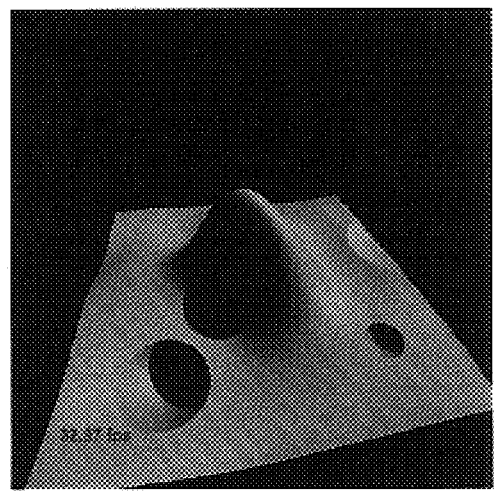

FIGS. 17A–C are renderings of the same bump mapped tessellated BSpline surface having 1600 vertices and 3042 triangles, and respectively showing dense shadows accomplished by horizon mapping, light shadows accomplished by horizon mapping, and light from a different direction seen from a different view, where FIGS. 17A and 17B simulate a shadow from a raised surface that is cast upon a shadow from the recessed surface.

In may be advantageous to alter the conventional graphics pipeline processing for the benefit of the foregoing implementation so as to reduce the number of passes required. One such option would be to put the alpha and stencil tests after the blending of fragments with the color already in the frame buffer. This alteration would eliminate the frame-buffer-to-texture-memory copy operation. To do so, the lighting direction could be written into tangent space into the alpha channel when the ambient term is written. Then, subtractions are made from the contributions from each of the direction passes. This would also eliminate one rendering pass for the geometry.

Having a versatile vertex shader, other than the functions of same that have been described herein, would allow the precomputation of the s, t texture coordinates, rather than requiring computation of the same at run time. It would be desirable that such versatility be fully interoperable with the transform and lighting components of conventional commodity graphics hardware.

As an option to the above described implementation a different implementation in commodity graphics hardware can also be made without leveraging dot product fragment operations. It has been found, however, that a significant performance penalty will be had without use of dot product fragments.

Figure 8:
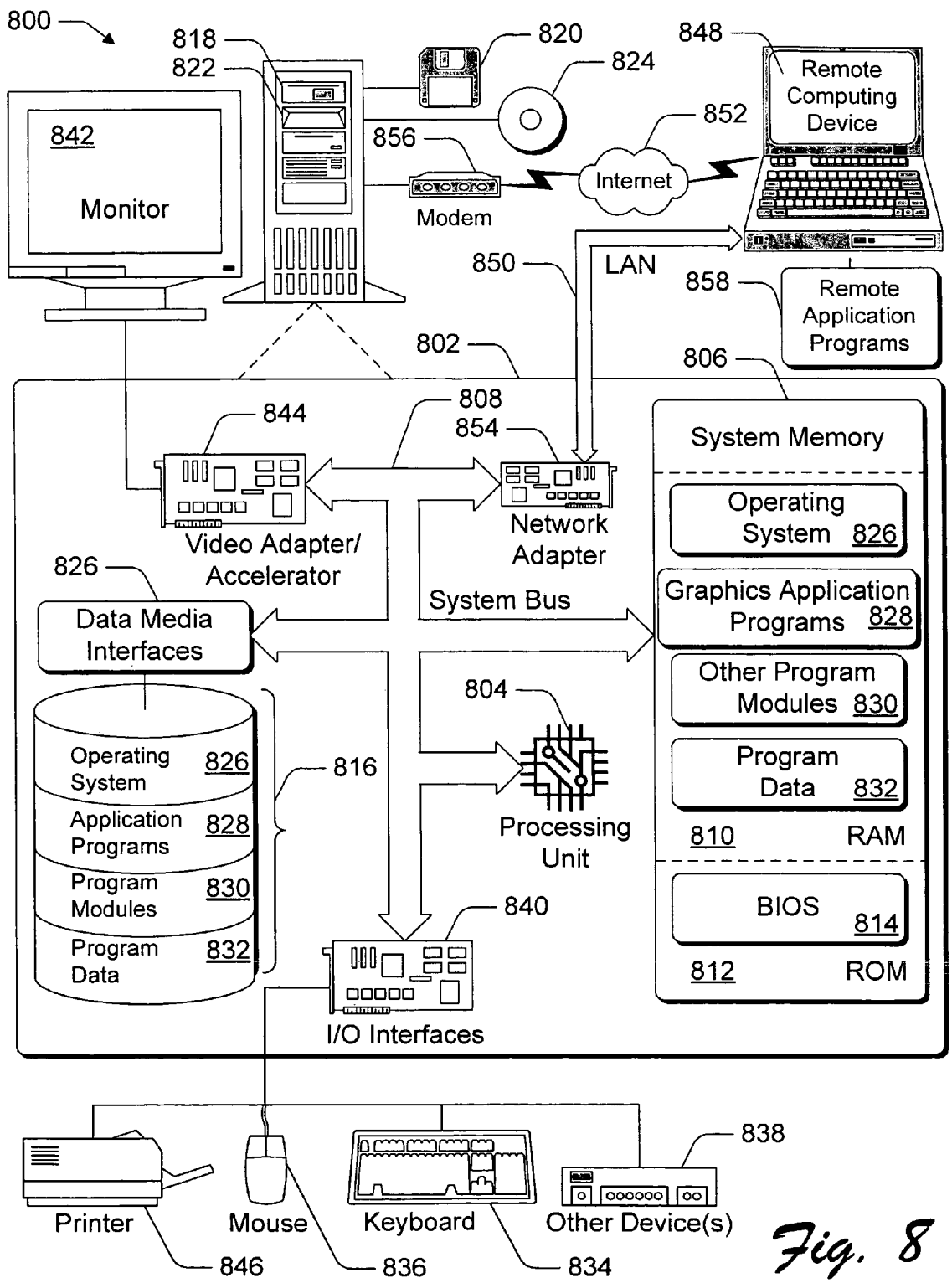
FIG. 8 is an example of a computing operating environment capable of implementing, either wholly or partially, an illustrative implementation of the invention.

The inventors intend these exemplary implementations to be examples and not to limit the scope of the present invention. Rather, the inventors have contemplated that the present invention might also be embodied and implemented in other ways, in conjunction with other present or future technologies Exemplary Computing System and Environment FIG. 8 illustrates an example of a suitable computing environment 800 within which interactive horizon mapping, as described herein, may be implemented (either fully or partially). The computing environment 800 may be utilized in the computer and network architectures described herein.

The exemplary computing environment 800 is only one example of a computing environment and is not intended to suggest any limitation as to the scope of use or functionality of the computer and network architectures. Neither should the computing environment 800 be interpreted as having any dependency or requirement relating to any one or combination of components illustrated in the exemplary computing environment 800.

Interactive horizon mapping may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Interactive horizon mapping may be described in the general context of computer-executable instructions, such as program modules, being executed by a computer. Generally, program modules include routines, programs, objects, components, data structures, etc. that perform particular tasks or implement particular abstract data types. Interactive horizon mapping may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing device in the form of a computer 802. The components of computer 802 can include, by are not limited to, one or more processors or processing units 804, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804. System memory 806 is an example of a means for storing data having inputs and outputs and a frame buffer for storing pixel representations from which to render a three-dimensional graphical object.

Computer 802 may also include other removable/non-removable, volatile/non-volatile computer storage media. By way of example, FIG. 13 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more graphics application programs 828, other program modules 830, and program data 832. Each of such operating system 826, one or more graphics application programs 828, other program modules 830, and program data 832 (or some combination thereof) may include an embodiment of program code to perform interactive horizon mapping.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter/accelerator 844. Video adapter/accelerator 844 is intended to have a component thereof that represents 3-D commodity graphics hardware. As such, the 3-D commodity graphics hardware is coupled to the high-speed system bus 806. The 3-D commodity graphics hardware may be coupled to the system bus 808 by, for example, a cross bar switch or other bus connectivity logic. It is assumed that various other peripheral devices, or other buses, may be connected to the high-speed system bus 808, as is well known in the art. Further, the 3-D commodity graphics hardware may be coupled through one or more other buses to system bus 808.

Host processor 804 may transfer information to and from the 3-D commodity graphics hardware according to a programmed input/output (I/O) protocol over the system bus 808. In one implementation, the 3-D commodity graphics hardware accesses the system memory 806 according to a direct memory access (DMA) protocol, or through intelligent bus mastering.

In one implementation, one or more graphics application programs 828 executing on processing unit 804 generates three-dimensional geometry data. The resulting 3-D geometry data can be stored in system memory 806 and then transferred to the 3-D commodity graphics hardware over system bus 808. The 3-D commodity graphics hardware renders the resulting primitives accordingly on monitor 842. The 3-D geometry data may also be transferred over a network for subsequent rendering, or stored to a removable medium such as a CD-ROM. The 3-D commodity graphics hardware performs bump mapping in a texture pipeline that includes dot products instructions.

In one implementation the 3-D commodity graphics hardware component of video adapter/accelerator 844 is intended to function as a 3-D graphics accelerator having a specialized rendering subsystem which is designed to off-load graphics processing functions from host processing unit 804, thereby improving system performance. As such, an application program from any of program modules 828–830 executing on host processing unit 804 generates three-dimensional geometry data including information corresponding to points on the surface of a three-dimensional graphical object. These points are usable as vertices of polygons which, when connected, may be rendered to form a representation of the graphical object. The application program causes host processing unit 840 to transfer this 3-D geometry data to the graphics accelerator, along with corresponding control and connectivity information. The graphics accelerator receives this stream of 3-D geometry data and renders the encoded polygons on an attached display device.

Hosting processing unit 804 and video adapter/accelerator 844 function together as an example of a means for generating a bump mapped surface of a three-dimensional graphical object and a means for generating a horizon map of the bump mapped surface. System memory 806 is an example of a means for storing the generated horizon map in a texture map for reuse in rendering the three-dimensional graphical object. Host processor 804 and video adapter/accelerator 844 are illustrated as being coupled to monitor 842, several input devices, and system memory 806. This coupling enable control of bump and horizon map generation as well as the pixel representations in the frame buffer of system memory 806 to produce on the monitor 842 a rendering of shadows cast by light upon the bump mapped surface of the three-dimensional graphical object as a function of the horizon map.

In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like.

The remote computing device 848 is illustrated as a portable computer that can include many or all of the elements and features described herein relative to computer 802. Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components such as the operating system are illustrated herein as discrete blocks, although it is recognized that such programs and components reside at various times in different storage components of the computing device 802, and are executed by the data processor(s) of the computer.

Computer-Executable Instructions

An implementation of interactive horizon mapping may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 8 illustrates an example of a suitable operating environment 800 in which an exemplary interactive horizon mapping may be implemented. Specifically, the exemplary interactive horizon mapping described herein may be implemented (wholly or in part) by any program modules 828–830 and/or operating system 826 in FIG. 8 or a portion thereof.

The operating environment is only an example of a suitable operating environment and is not intended to suggest any limitation as to the scope or use of functionality of the exemplary interactive horizon mapping described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary interactive horizon mapping may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

For purposes of the explanation, specific numbers, materials and configurations are set forth above in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, and thereby better explain the present invention. Furthermore, for ease of understanding, certain method operations are delineated as separate operations; however, these separately delineated operations should not be construed as necessarily order dependent in their performance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer system configured for determining shadowing cast onto a bump mapped surface by one or more bumps thereon, where the bump mapped surface is represented by a plurality of polygons each having a plurality of vertices, each vertex defining a point in a tangent plane of the bump mapped surface, where a normal vector at each said vertex is perturbed to define a bump map of the bump mapped surface that includes a plurality of bumps on the surface, the computer system comprising:

means for defining a horizon map of the surface including, for each of a plurality of radial directions in the tangent plane around each said vertex, the largest angle between the normal vector and any direct ray of light to the vertex;

means for storing the horizon map as a set of texture maps corresponding to the surface on the three-dimensional graphical object; and wherein for each said vertex, each said texture map has a plurality of color channels, each said color channel having encoded therein the largest angle between the normal vector and any direct ray of light to the vertex that does not contact any of the bumps on the surface.

2. The computer system as defined in claim 1, further comprising:

means for executing an interactive program that defines a light source by a direction relative to:
the tangent plane of the surface; and
the normal of each said vertex;

means for determining at least two of the radial directions stored in the horizon map with respect to the direction of the light source;

means for interpolating from the largest angles at the at least two radial directions of the horizon map to obtain the portion of each said polygon that is in the light from the light source;

means for rendering the surface on the three-dimensional graphical object, from a given point of view, to include only the portion of each said polygon that is in the light from the light source;

means for interactively receiving instructions to change the direction of the light source relative to the surface on the three-dimensional graphical object;

means for repeating the determining by interpolation step using the changed direction of the light source relative to the surface on the three-dimensional graphical object; and means for repeating the rendering.

3. The computer system as defined in claim 1, wherein:
the set of texture maps comprises two texture maps; and
each said texture map:
corresponds to not more that four of the radial directions; and
has four color channels each having not more than one radial direction encoding for the corresponding largest angle for each vertex between the normal vector and any direct ray of light to the vertex that does not contact any of the bumps on the surface.

4. A computer system configured for rendering a frame in a frame buffer represented by a plurality of pixels, the frame depicting a three dimensional graphical object that is defined by surfaces each having a surface geometry defined by a parameterization of a plurality of polygons, each polygon being defined by vertices, each vertex (u,v) having a bump map scalar value F(u,v) defining a bump, each vertex (u,v) having a perturbed normal map vector value N'(u,v) from the bump map scalar value F(u,v), each vertex (u,v) having M basis maps ($B_{k=1 \ldots M}$ (s, t)), each vertex (u,v) having M horizon maps for each of M radial directions ($\theta k=1 \ldots M$) in the tangent plane of the vertex (u, v), wherein each of the M horizon maps includes the largest angle $\Phi(u,v,\theta k=1 \ldots M)$ between the perturbed normal map vector value N'(u, v) and any direct ray to the vertex (u, v), the computer system comprising:

(i) means for defining a light vector (L) having a direction defined by:
the angle $\theta_L$ between the light vector (L) and the plane formed by coordinates (u,v); and
the angle $\Phi_L$ between the light vector (L) and the perturbed normal map vector value N'(u,v);

(ii) means for inverting a local tangent frame by [Pu, Pv, N]−1=[ST, TT, NT] to obtain an inverted tangent frame (S,T);

(iii) means for taking the dot product of the light vector (L):
with the first two components of the inverted frame (S,T) to obtain the projection of the light vector (L) into the coordinate space in the tangent plane at a coordinate pair (s,t); and
with the perturbed normal map vector value N'(u, v) at the vertex to obtain cosine ($\Phi_L$);

(iv) means for setting the camera angle of the rendering to a point of view to be rendered for the frame to write into the space of a texture map;

(v) means for computing first and second texture effects on each pixel in the frame buffer, respectively, from first and second sets of the M directions stored as texture maps, wherein each said largest angle $\Phi(u,v,\theta k)$ is in one of a plurality of color channels of a texture map, wherein one of the M directions corresponds to each said color channel of the texture map, and wherein the first and second texture effects are defined, respectively by:
a basis map $B_1$ (s, t) of said M basis maps ($B_{k=1 \ldots M}$ (s, t)), and a horizon map, $\Phi_1$ (u, v) of said M horizon maps; and
a basis map B2 (s, t) of said M basis maps (Bk=1 . . . M (s, t)), and a horizon map, $\Phi 2$ (u, v) of said M horizon maps;

(vi) means for storing the first and second texture effects for each pixel in the frame buffer in a texture map $\Phi(\theta LIGHT)$;

(vii) for a given camera perspective view:
on a first operation, means for rendering a model of the three dimensional graphical object with an ambient low level lighting term only;
on a second operation:
means for setting an alpha test and a stencil function to accept only those pixels in the frame buffer that have a non-zero alpha test result;
means for setting a color mask upon the frame buffer, wherein the color mask will not write to the color channels of the texture maps, whereby the ambient low level lighting term previously rendered is preserved;
means for drawing, using multi-texturing, for the angle ($\Phi_L$) and the angle to the horizon ($\theta_L$), the first and second texture effects on each pixel in the frame buffer, which are, respectively, cosine($\Phi_L$) that is greater than $\Phi_L$, and $\Phi(\theta_{LIGHT})$;
on a third operation:
means for setting the alpha test off;
means for setting the color mask upon the frame buffer to allow writing to the color channels of the texture maps;
means for setting the stencil function to only draw pixels in the frame buffer that have a non-zero alpha test result;
means for setting a blending function to accumulate into the frame buffer with the ambient low level lighting term;
means for drawing the vector valued perturbed normal map N'(u,v); and
means for displaying the three dimensional graphical object defined by pixels in the frame buffer, wherein the displayed object has an ambient only term in shadowed regions and normal bump mapping in non-shadowed regions.

5. The computer system as recited in claim 4, further comprising:
means for interactively receiving instructions that change the definition of the light vector (L) with respect to each vertex (u,v); and
means for repeating (i) through (vii) using the changed definition of the light vector (L).

6. A computer system configured for determining shadowing cast onto a bump mapped surface by one or more bumps thereon, where the bump mapped surface is represented by a plurality of polygons each having a plurality of vertices, each vertex defining a point in a tangent plane of the bump mapped surface, where a normal vector at each said vertex is perturbed to define a bump map of the bump mapped surface that includes a plurality of bumps on the surface, the computer system comprising logic configured for:
defining a horizon map of the surface including, for each of a plurality of radial directions in the tangent plane around each said vertex, the largest angle between the normal vector and any direct ray of light to the vertex;
storing the horizon map as a set of texture maps corresponding to the surface on the three-dimensional graphical object; and
wherein for each said vertex, each said texture map has a plurality of color channels, each said color channel having encoded therein the largest angle between the normal vector and any direct ray of light to the vertex that does not contact any of the bumps on the surface.

7. The computer system as defined in claim 6, further comprising logic configured for:
executing an interactive program that defines a light source by a direction relative to:
the tangent plane of the surface; and
the normal of each said vertex;
determining at least two of the radial directions stored in the horizon map with respect to the direction of the light source;
interpolating from the largest angles at the at least two radial directions of the horizon map to obtain the portion of each said polygon that is in the light from the light source;
rendering the surface on the three-dimensional graphical object, from a given point of view, to include only the portion of each said polygon that is in the light from the light source;
interactively receiving instructions to change the direction of the light source relative to the surface on the three-dimensional graphical object;
repeating the determining by interpolation step using the changed direction of the light source relative to the surface on the three-dimensional graphical object; and
repeating the rendering.

8. The computer system as defined in claim 6, wherein:
the set of texture maps comprises two texture maps; and
each said texture map:
corresponds to not more that four of the radial directions; and
has four color channels each having not more than one radial direction encoding for the corresponding largest angle for each vertex between the normal vector and any direct ray of light to the vertex that does not contact any of the bumps on the surface.

9. A computer system configured for rendering a frame in a frame buffer represented by a plurality of pixels, the frame depicting a three dimensional graphical object that is defined by surfaces each having a surface geometry defined by a parameterization of a plurality of polygons, each polygon being defined by vertices, each vertex (u,v) having a bump map scalar value F(u,v) defining a bump, each vertex (u,v) having a perturbed normal map vector value N'(u,v) from the bump map scalar value F(u,v), each vertex (u,v) having M basis maps (Bk=1 . . . M (s, t)), each vertex (u,v) having M horizon maps for each of M radial directions ($\theta$k=1 . . . M) in the tangent plane of the vertex (u, v), wherein each of the M horizon maps includes the largest angle $\Phi$(u,v,$\theta$k=1 . . . M) between the perturbed normal map vector value N'(u, v) and any direct ray to the vertex (u, v), the computer system comprising logic configured for:
(i) defining a light vector (L) having a direction defined by:
the angle $\theta_L$ between the light vector (L) and the plane formed by coordinates (u,v); and
the angle $\Phi_L$ between the light vector (L) and the perturbed normal map vector value N'(u,v);
(ii) inverting a local tangent frame by [Pu, Pv, N]−1=[ST, TT, NT] to obtain an inverted tangent frame (S,T);
(iii) taking the dot product of the light vector(L):
with the first two components of the inverted frame (S,T) to obtain the projection of the light vector (L) into the coordinate space in the tangent plane at a coordinate pair (s,t); and
with the perturbed normal map vector value N'(u, v) at the vertex to obtain cosine ($\Phi_L$);
(iv) setting the camera angle of the rendering to a point of view to be rendered for the frame to write into the space of a texture map;
(v) computing first and second texture effects on each pixel in the frame buffer, respectively, from first and second sets of the M directions stored as texture maps, wherein each said largest angle $\Phi$(u,v,$\theta$k) is in one of a plurality of color channels of a texture map, wherein one of the M directions corresponds to each said color channel of the texture map, and wherein the first and second texture effects are defined, respectively by:
a basis map $B_1$ (s, t) of said M basis maps ($B_{k=1...M}$(s, t)), and a horizon map, $\Phi_1$(u, v) of said M horizon maps; and
a basis map B2 (s, t) of said M basis maps (Bk=1 . . . M (s, t)), and a horizon map, $\Phi$2 (u, v) of said M horizon maps;
(vi) storing the first and second texture effects for each pixel in the frame buffer in a texture map $\Phi$($\theta$LIGHT);
(vii) for a given camera perspective view:
on a first operation, rendering a model of the three dimensional graphical object with an ambient low level lighting term only;
on a second operation:
setting an alpha test and a stencil function to accept only those pixels in the frame buffer that have a non-zero alpha test result;
setting a color mask upon the frame buffer, wherein the color mask will not write to the color channels of the texture maps, whereby the ambient low level lighting term previously rendered is preserved;
drawing, using multi-texturing, for the angle ($\Phi_L$) and the angle to the horizon ($\theta_L$), the first and second texture effects on each pixel in the frame buffer, which are, respectively, cosine($\Phi_L$) that is greater than $\Phi_L$, and $\Phi$($\theta_{LIGHT}$);

on a third operation:
  setting the alpha test off;
  setting the color mask upon the frame buffer to allow writing to the color channels of the texture maps;
  setting the stencil function to only draw pixels in the frame buffer that have a non-zero alpha test result;
  setting a blending function to accumulate into the frame buffer with the ambient low level lighting term;
  drawing the vector valued perturbed normal map N'(u,v); and
  displaying the three dimensional graphical object defined by pixels in the frame buffer, wherein the displayed object has an ambient only term in shadowed regions and normal bump mapping in non-shadowed regions.

10. The computer system as recited in claim 9, further comprising logic configured for:
  interactively receiving instructions that change the definition of the light vector (L) with respect to each vertex (u,v); and
  repeating (i) through (vii) using the changed definition of the light vector (L).

* * * * *